US008488770B2

(12) United States Patent  (10) Patent No.: US 8,488,770 B2
Mahoney et al.  (45) Date of Patent: *Jul. 16, 2013

(54) SYSTEM AND METHOD FOR AUTOMATING CUSTOMER RELATIONS IN A COMMUNICATIONS ENVIRONMENT

(75) Inventors: Kirk Mahoney, Houston, TX (US); Lona Noelle Dallessandro, Austin, TX (US); James Austin Britt, Austin, TX (US); Douglas Bruun, San Ramon, CA (US); Rosalinda Garcia, Lubbock, TX (US); Jonathan Paden, Austin, TX (US); Ellen Pate, Dripping Springs, TX (US); Kristina Robinson, Austin, TX (US); Tom Wiatt, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/517,875

(22) Filed: Jun. 14, 2012

(65) Prior Publication Data

US 2012/0250851 A1 Oct. 4, 2012

Related U.S. Application Data

(63) Continuation of application No. 11/086,794, filed on Mar. 22, 2005.

(51) Int. Cl.
*H04M 3/00* (2006.01)
*H04M 11/00* (2006.01)

(52) U.S. Cl.
USPC .................................. 379/265.02; 379/100.05

(58) Field of Classification Search
USPC ............... 379/265.02–266.01, 32.01, 100.05; 455/426.2; 370/352–356
See application file for complete search history.

(56) References Cited

U.S. PATENT DOCUMENTS 4,953,204 A 8/1990 Cuschelg, Jr. et al.
4,967,405 A 10/1990 Upp et al.
(Continued)

FOREIGN PATENT DOCUMENTS

EP 0 424 015 4/1991
EP 0 876 652 9/1996
(Continued)

OTHER PUBLICATIONS

Non-Final Office Action for U.S. Appl. No. 11/086,794 received from the United States Patent and Trademark Office (USPTO) mailed Nov. 28, 2008, 35 pages.

(Continued)

*Primary Examiner* — Mohammad Islam
(74) *Attorney, Agent, or Firm* — Toler Law Group, PC

(57) ABSTRACT

A method includes receiving performance data associated with a service provided by at least one component of a communication network to one or more subscribers. The performance data may be gathered by one or more passive listening devices that monitor a performance characteristic of the at least one component of the communication network. The method further includes identifying the at least one component that provides a particular service to a particular subscriber based on a subscriber inquiry received from the particular subscriber. The method further includes identifying particular performance data within the received performance data. The particular performance data may be associated with the particular service provided by the at least one component. The method further includes determining a performance status of the at least one component, based on the particular performance data.

20 Claims, 2 Drawing Sheets

U.S. PATENT DOCUMENTS

| | | |
|---|---|---|
| 4,975,841 A | 12/1990 | Kehnemuyi et al. |
| 5,297,183 A | 3/1994 | Bareis et al. |
| 5,299,260 A | 3/1994 | Shaio |
| 5,309,513 A | 5/1994 | Rose |
| 5,335,269 A | 8/1994 | Steinlicht |
| 5,432,845 A | 7/1995 | Burd et al. |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Llao et al. |
| 5,621,789 A | 4/1997 | McCalmont et al. |
| 5,652,789 A | 7/1997 | Miner |
| 5,732,133 A | 3/1998 | Mark |
| 5,754,639 A | 5/1998 | Flockhart et al. |
| 5,754,978 A | 5/1998 | Perez-Mendez et al. |
| 5,794,001 A | 8/1998 | Malone et al. |
| 5,845,062 A | 12/1998 | Branton et al. |
| 5,867,817 A | 2/1999 | Catallo et al. |
| 5,923,745 A | 7/1999 | Hurd |
| 5,937,051 A | 8/1999 | Hurd et al. |
| 5,940,476 A | 8/1999 | Morganstein |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,016,336 A | 1/2000 | Hanson |
| 6,038,293 A | 3/2000 | McNerney et al. |
| 6,049,594 A | 4/2000 | Furman et al. |
| 6,061,433 A | 5/2000 | Polcyn et al. |
| 6,118,866 A | 9/2000 | Shtivelman |
| 6,119,101 A | 9/2000 | Peckover |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,181,776 B1 | 1/2001 | Crossley et al. |
| 6,259,786 B1 | 7/2001 | Gisby |
| 6,269,153 B1 | 7/2001 | Carpenter et al. |
| 6,317,439 B1 | 11/2001 | Cardona et al. |
| 6,320,951 B1 | 11/2001 | Shtivelman et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 | 4/2002 | Borst et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 | 6/2002 | Bohacek et al. |
| 6,414,966 B1 | 7/2002 | Kulkarni et al. |
| 6,418,424 B1 | 7/2002 | Hoffberg et al. |
| 6,442,247 B1 | 8/2002 | Garcia et al. |
| 6,496,567 B1 | 12/2002 | Bjornberg et al. |
| 6,496,836 B1 | 12/2002 | Ronchi et al. |
| 6,510,414 B1 | 1/2003 | Chaves |
| 6,519,562 B1 | 2/2003 | Phillips et al. |
| 6,529,871 B1 | 3/2003 | Kanevsky et al. |
| 6,553,112 B2 | 4/2003 | Ishikawa |
| 6,553,113 B1 | 4/2003 | Dhir et al. |
| 6,570,967 B2 | 5/2003 | Katz |
| 6,574,599 B1 | 6/2003 | Lim et al. |
| 6,577,718 B1 | 6/2003 | Kalmanek et al. |
| 6,584,180 B2 | 6/2003 | Nemoto |
| 6,584,191 B1 | 6/2003 | McPartlan et al. |
| 6,587,556 B1 | 7/2003 | Judkins et al. |
| 6,587,558 B2 | 7/2003 | Lo |
| 6,594,470 B1 | 7/2003 | Barnes et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,631,186 B1 | 10/2003 | Adams et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,458 B1 | 2/2004 | Kunjibettu |
| 6,697,460 B2 | 2/2004 | Knott et al. |
| 6,697,806 B1 | 2/2004 | Cook |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,721,416 B1 | 4/2004 | Farrell |
| 6,731,722 B2 | 5/2004 | Coffey |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,751,591 B1 | 6/2004 | Gorin et al. |
| 6,757,306 B1 | 6/2004 | Klish et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,847,715 B1 | 1/2005 | Swartz |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,895,083 B1 | 5/2005 | Bers et al. |
| 6,895,532 B2 | 5/2005 | Raynham |
| 6,901,366 B1 | 5/2005 | Kuhn et al. |
| 6,907,119 B2 | 6/2005 | Case et al. |
| 6,915,246 B2 | 7/2005 | Gusler et al. |
| 6,963,983 B2 | 11/2005 | Munson et al. |
| 7,006,605 B1 | 2/2006 | Morganstein et al. |
| 7,031,444 B2 | 4/2006 | Shen et al. |
| 7,035,388 B2 | 4/2006 | Kurosaki |
| 7,050,936 B2 | 5/2006 | Levy et al. |
| 7,065,201 B2 | 6/2006 | Bushey et al. |
| 7,124,059 B2 | 10/2006 | Wetzer et al. |
| 7,206,400 B2 | 4/2007 | Dezonno et al. |
| 7,231,384 B2 | 6/2007 | Wu et al. |
| 7,242,751 B2 | 7/2007 | Bushey et al. |
| 7,245,716 B2 | 7/2007 | Winters et al. |
| 7,346,152 B2 | 3/2008 | Paden et al. |
| 7,379,886 B1 | 5/2008 | Zaring et al. |
| 7,430,554 B1 | 9/2008 | Heisinger |
| 7,506,241 B2 | 3/2009 | Chefalas et al. |
| 7,512,545 B2 | 3/2009 | Knott et al. |
| 7,660,233 B2 | 2/2010 | Paden et al. |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032075 A1 | 10/2001 | Yamamoto |
| 2001/0032229 A1 | 10/2001 | Hulls et al. |
| 2001/0034662 A1 | 10/2001 | Morris |
| 2002/0046030 A1 | 4/2002 | Haritsa |
| 2002/0055975 A1 | 5/2002 | Petrovykh |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0067714 A1 | 6/2002 | Crain et al. |
| 2002/0087316 A1 | 7/2002 | Lee et al. |
| 2002/0087385 A1 | 7/2002 | Vincent |
| 2002/0087558 A1 | 7/2002 | Bailey et al. |
| 2002/0114432 A1 | 8/2002 | Shaffer et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes |

| | | | | | | |
|---|---|---|---|---|---|---|
| 2002/0156699 | A1 | 10/2002 | Gray et al. | 2006/0018443 A1 | 1/2006 | Knott et al. |
| 2002/0165732 | A1 | 11/2002 | Ezzeddine et al. | 2006/0023863 A1 | 2/2006 | Joseph |
| 2002/0169606 | A1 | 11/2002 | Bantz et al. | 2006/0026049 A1 | 2/2006 | Joseph et al. |
| 2002/0196277 | A1 | 12/2002 | Bushey et al. | 2006/0036437 A1 | 2/2006 | Bushey et al. |
| 2003/0026409 | A1 | 2/2003 | Bushey et al. | 2006/0039547 A1 | 2/2006 | Klein |
| 2003/0035381 | A1 | 2/2003 | Chen et al. | 2006/0050865 A1 | 3/2006 | Kortum et al. |
| 2003/0035516 | A1 | 2/2003 | Guedalia | 2006/0056287 A1 | 3/2006 | Paden et al. |
| 2003/0069937 | A1 | 4/2003 | Khouri et al. | 2006/0062375 A1 | 3/2006 | Pasquale et al. |
| 2003/0097428 | A1 | 5/2003 | Afkhami et al. | 2006/0072737 A1 | 4/2006 | Paden et al. |
| 2003/0103619 | A1 | 6/2003 | Brown et al. | 2006/0085538 A1 | 4/2006 | Newman et al. |
| 2003/0114105 | A1 | 6/2003 | Haller et al. | 2006/0093097 A1 | 5/2006 | Chang |
| 2003/0118159 | A1 | 6/2003 | Shen et al. | 2006/0100998 A1 | 5/2006 | Edwards et al. |
| 2003/0130864 | A1 | 7/2003 | Ho et al. | 2006/0109974 A1 | 5/2006 | Paden et al. |
| 2003/0143981 | A1 | 7/2003 | Kortum et al. | 2006/0109976 A1 | 5/2006 | Sundaram et al. |
| 2003/0144846 | A1 | 7/2003 | Denenberg et al. | 2006/0115070 A1 | 6/2006 | Bushey et al. |
| 2003/0144919 | A1 | 7/2003 | Trompette et al. | 2006/0126808 A1 | 6/2006 | Dallessandro et al. |
| 2003/0154184 | A1 | 8/2003 | Chee et al. | 2006/0126811 A1 | 6/2006 | Bushey et al. |
| 2003/0156133 | A1 | 8/2003 | Martin et al. | 2006/0133587 A1 | 6/2006 | Bushey et al. |
| 2003/0165223 | A1 | 9/2003 | Timmins et al. | 2006/0146806 A1 | 7/2006 | Khuc et al. |
| 2003/0179876 | A1 | 9/2003 | Fox et al. | 2006/0153345 A1 | 7/2006 | Bushey et al. |
| 2003/0187732 | A1 | 10/2003 | Seta | 2006/0159240 A1 | 7/2006 | Bushey |
| 2003/0187773 | A1 | 10/2003 | Santos et al. | 2006/0161431 A1 | 7/2006 | Bushey |
| 2003/0194063 | A1 | 10/2003 | Martin et al. | 2006/0165057 A1 | 7/2006 | Paden et al. |
| 2003/0195753 | A1 | 10/2003 | Homuth | 2006/0177040 A1 | 8/2006 | Mitra |
| 2003/0202640 | A1 | 10/2003 | Knott et al. | 2006/0188087 A1 | 8/2006 | Kortum |
| 2003/0202643 | A1 | 10/2003 | Joseph et al. | 2006/0198505 A1 | 9/2006 | Kortum |
| 2003/0202649 | A1 | 10/2003 | Haug, Jr. et al. | 2006/0215831 A1 | 9/2006 | Knott et al. |
| 2003/0204435 | A1 | 10/2003 | McQuilkin et al. | 2006/0256932 A1 | 11/2006 | Bushey et al. |
| 2003/0228007 | A1 | 12/2003 | Kurosaki | 2006/0256956 A1 | 11/2006 | Lee et al. |
| 2003/0235287 | A1 | 12/2003 | Margolis et al. | 2006/0291642 A1 | 12/2006 | Bushey et al. |
| 2004/0005047 | A1 | 1/2004 | Joseph et al. | 2006/0291644 A1 | 12/2006 | Ellinwood |
| 2004/0006473 | A1 | 1/2004 | Mills et al. | 2007/0019800 A1 | 1/2007 | Bushey et al. |
| 2004/0030649 | A1 | 2/2004 | Nelson et al. | 2007/0025528 A1 | 2/2007 | Knott et al. |
| 2004/0032862 | A1 | 2/2004 | Schoeneberger et al. | 2007/0025542 A1 | 2/2007 | Bushey et al. |
| 2004/0032935 | A1 | 2/2004 | Mills et al. | 2007/0041551 A1 | 2/2007 | Whitecotten et al. |
| 2004/0042592 | A1 | 3/2004 | Knott et al. | 2007/0047718 A1 | 3/2007 | Idler et al. |
| 2004/0044950 | A1 | 3/2004 | Mills et al. | 2007/0047720 A1 | 3/2007 | Brandt et al. |
| 2004/0066401 | A1 | 4/2004 | Bushey et al. | 2007/0116230 A1 | 5/2007 | Brandt et al. |
| 2004/0066416 | A1 | 4/2004 | Knott et al. | 2007/0206772 A1 | 9/2007 | Sato et al. |
| 2004/0073569 | A1 | 4/2004 | Knott et al. | 2008/0008308 A1 | 1/2008 | Knott et al. |
| 2004/0083479 | A1 | 4/2004 | Bondarenko et al. | | | |
| 2004/0088285 | A1 | 5/2004 | Martin et al. | | | |

FOREIGN PATENT DOCUMENTS

| | | |
|---|---|---|
| WO | WO 0137539 | 5/2001 |
| WO | WO 2004017584 | 2/2004 |
| WO | WO 2004049222 | 6/2004 |

OTHER PUBLICATIONS

Non-Final Office Action for U.S. Appl. No. 11/086,794 received from the United States Patent and Trademark Office (USPTO) mailed Jun. 8, 2009, 31 pages.

Non-Final Office Action for U.S. Appl. No. 11/086,794 received from the United States Patent and Trademark Office (USPTO) mailed Dec. 16, 2009, 52 pages.

Final Office Action for U.S. Appl. No. 11/086,794 received from the United States Patent and Trademark Office (USPTO) mailed Apr. 29, 2010, 17 pages.

Non-Final Office Action for U.S. Appl. No. 11/086,794 received from the United States Patent and Trademark Office (USPTO) mailed Aug. 20, 2010, 18 pages.

Final Office Action for U.S. Appl. No. 11/086,794 received from the United States Patent and Trademark Office (USPTO) mailed Jan. 24, 2011, 20 pages.

Non-Final Office Action for U.S. Appl. No. 11/086,794 received from the United States Patent and Trademark Office (USPTO) mailed May 4, 2011, 20 pages.

Final Office Action for U.S. Appl. No. 11/086,794 received from the United States Patent and Trademark Office (USPTO) mailed Aug. 30, 2011, 17 pages.

Non-Final Office Action for U.S. Appl. No. 11/086,794 received from the United States Patent and Trademark Office (USPTO) mailed Dec. 14, 2011, 24 pages.

Notice of Allowance for U.S. Appl. No. 11/086,794 received from the United States Patent and Trademark Office (USPTO) mailed Mar. 14, 2012, 12 pages.

Ogino, Tsukas, et al.; "Technologies for Internet Infrastructure: Eliminating the World Wide Wait"; iNet Japan; Jul. 18-21, 2000; www.isoc.org/inet2000/cdproceedings/1g/index.htm.

| | | | |
|---|---|---|---|
| 2004/0103017 | A1 | 5/2004 | Reed |
| 2004/0109555 | A1 | 6/2004 | Williams |
| 2004/0120473 | A1 | 6/2004 | Birch et al. |
| 2004/0161078 | A1 | 8/2004 | Knott et al. |
| 2004/0161094 | A1 | 8/2004 | Martin et al. |
| 2004/0161096 | A1 | 8/2004 | Knott et al. |
| 2004/0174980 | A1 | 9/2004 | Knott et al. |
| 2004/0230438 | A1 | 11/2004 | Pasquale et al. |
| 2004/0240635 | A1 | 12/2004 | Bushey et al. |
| 2004/0243568 | A1 | 12/2004 | Wang et al. |
| 2005/0008141 | A1 | 1/2005 | Kortum et al. |
| 2005/0015744 | A1 | 1/2005 | Bushey et al. |
| 2005/0018825 | A1 | 1/2005 | Ho |
| 2005/0027535 | A1 | 2/2005 | Martin et al. |
| 2005/0041796 | A1 | 2/2005 | Joseph et al. |
| 2005/0047578 | A1 | 3/2005 | Knott et al. |
| 2005/0055216 | A1 | 3/2005 | Bushey et al. |
| 2005/0058264 | A1 | 3/2005 | Joseph et al. |
| 2005/0060200 | A1 | 3/2005 | Kobylevsky et al. |
| 2005/0075894 | A1 | 4/2005 | Bushey et al. |
| 2005/0078805 | A1 | 4/2005 | Mills et al. |
| 2005/0080630 | A1 | 4/2005 | Mills et al. |
| 2005/0080667 | A1 | 4/2005 | Knott et al. |
| 2005/0081696 | A1 | 4/2005 | Kapolnek |
| 2005/0131892 | A1 | 6/2005 | Knott et al. |
| 2005/0132262 | A1 | 6/2005 | Bushey et al. |
| 2005/0135595 | A1 | 6/2005 | Bushey et al. |
| 2005/0141692 | A1 | 6/2005 | Scherer et al. |
| 2005/0147218 | A1 | 7/2005 | Novack et al. |
| 2005/0152530 | A1 | 7/2005 | Pence |
| 2005/0169441 | A1 | 8/2005 | Yacoub |
| 2005/0169453 | A1 | 8/2005 | Knott et al. |
| 2005/0195961 | A1 | 9/2005 | Pasquale |
| 2005/0201547 | A1 | 9/2005 | Burg et al. |
| 2005/0254632 | A1 | 11/2005 | Pasquale et al. |
| 2005/0278655 | A1 | 12/2005 | Sims |
| 2006/0002540 | A1 | 1/2006 | Kreiner et al. |

SYSTEM AND METHOD FOR AUTOMATING CUSTOMER RELATIONS IN A COMMUNICATIONS ENVIRONMENT

PRIORITY CLAIM

The present application claims priority from and is a continuation of patent application Ser. No. 11/086,794, filed on Mar. 22, 2005 and entitled "SYSTEM AND METHOD FOR AUTOMATING CUSTOMER RELATIONS IN A COMMUNICATIONS ENVIRONMENT," the contents of which are incorporated herein by reference in their entirety.

FIELD OF THE DISCLOSURE

The present disclosure relates generally to automating customer support.

BACKGROUND

In today's competitive communications market, service providers strive to improve system performance. Although near perfect reliability and extraordinary speeds are goals of service providers, often unplanned and unexpected phenomena degrade system performance. When a customer feels that performance of their communications system is less than average, they often call a service center to request information, determine if there is an outage, or see if there is work in process to solve their problem. Often customer equipment fails, yet the customer will blame the service provider and inquire whether the service provider is having problems.

Communication service providers seek to efficiently address these concerned subscribers. However, service providers often lack the available resources to identify problems that are specific to subscribers. A single subscriber may be provided with physical connections and signal processing from many different providers within a network.

BRIEF DESCRIPTION OF THE DRAWINGS

It will be appreciated that, for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

A system and method are disclosed for automating network performance reporting. In some cases, the reporting may be provided to a customer and/or to a customer support department. Depending upon implementation detail, a system incorporating the present teachings may include a passive listening device configured to monitor portions of a communication network. A performance database may be coupled directly and/or indirectly to the passive listening device and configured to store network performance data.

A customer relations module may be set up to receive a subscriber inquiry and to identify at least one component of a communication network that affects the subscriber. The module may retrieve relevant performance data on identified components of the communication network to provide customer-specific communication performance data to the subscriber and/or an agent assisting the subscriber. In one configuration, the passive listening device can be configured to monitor at least one performance characteristic of a communications network component and to output a plurality of signals representing the performance characteristic. A customer relations management module may be configured to manage customer connection data, to create a list of components used by a given subscriber, and to identify and provide a status of components that have or continue to affect the service provided to the given subscriber.

Figure 1:
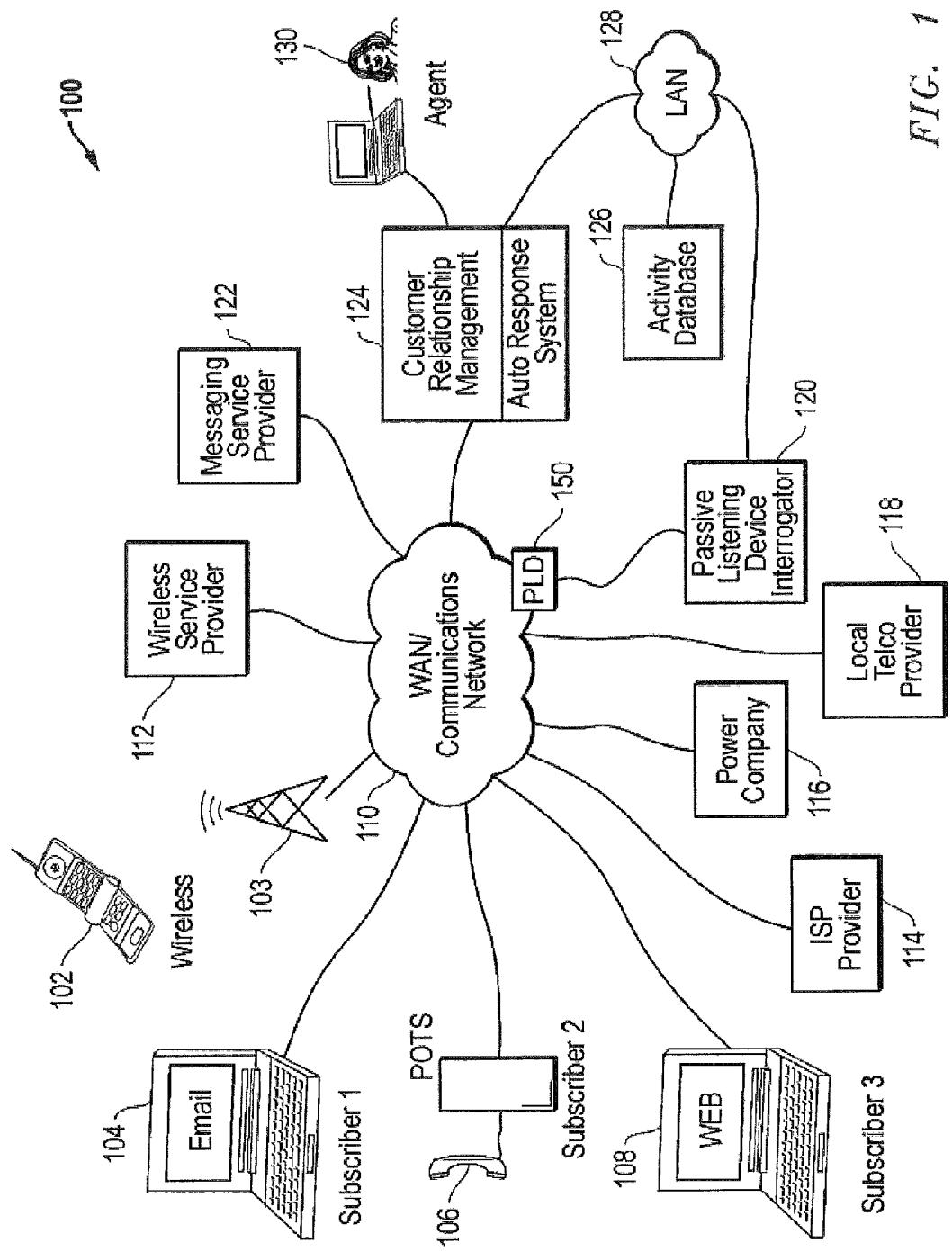
FIG. 1 presents a block diagram of a communication system that incorporates teachings of the present disclosure.

Referring to FIG. 1 an illustrated system 100 for detecting network performance and providing customer specific performance data to a customer via a customer relationship management module 124 is provided. As depicted, system 100 may help support subscribers and include client interaction interfaces such as e-mail interface 104, telephone interface 106, mobile/wireless interface 102, utilizing antennae 103, and/or Internet interface 108.

System 100 may be implemented by and/or in connection with a communications network-like wide area network (WAN) 110 that facilitates the coupling together of a plurality of service providers such as Internet Service Provider (ISP) 114, power company 116, local Telco provider 118, wireless service provider 112, and messaging service provider 122. System 100 may also include a service bureau offering that assists in near real time tracking of network performance for individual subscribers. As depicted, this service bureau may include a local area network (LAN) 128 interconnecting several components such as customer relationship management module 124, passive listening device interrogator 120, activity database 126, and agent 130.

In an illustrated embodiment, passive listening device interrogator 120 may include a specialized server for locating, addressing, and receiving information from various passive listening devices (PLDs) such as stand-alone PLD 150 located within WAN 110. As depicted, WAN 110 could take several forms including the Public Internet. Depending upon how a designer elects to implement system 100, various components of WAN 110 may have PLDs installed within them. For example, each of the depicted service providers and each of the subscriber interface mechanisms could contain at least one PLD. Stand-alone PLDs may also be installed at predefined critical locations. These PLDs may be configured to periodically transmit status information over WAN 110, and/or the PLDs may be responsive to interrogation by PLD interrogator 120.

When a subscriber experiences perceived problems in communicating via WAN 110 and/or some other network, the subscriber may call a customer service department and be placed in contact with customer relationship management module (CRMM) 124. CRMM 124 may be designed to include an auto-response system and a database maintaining customer information such as customer account information. In operation, CRMM 124 may receive a call and based on "call data" received with the call such as CallerID, a CRMM 124 database may be accessed to determine additional information about the subscriber. The additional information can include, for example, subscriber location, the services provided to the subscriber, the communication path servicing the subscriber, and/or a list of PLD monitored components providing service to the subscriber.

Utilizing the customer/subscriber specific information, activity database 126 may be accessed over LAN 128. In some implementations, CRMM 124 may request activity data specific to one or more of the monitored components, which may be components of WAN 110 that supply/support the subject subscriber. Activity database 126 may respond to the request by providing information reflecting the performance of monitored components. The information may be updateable. For example, passive listening device interrogator 120 may send queries to distributed PLDs, receive data from component-based PLDs throughout WAN 110, and write some portion of the received data to activity database 126.

In one instance, PLD interrogator 120 may send periodic queries to PLDs throughout WAN 110. PLD interrogator 120 may also send near-real-time queries to implicated PLDs throughout WAN 110 in response to a particular subscriber inquiry. PLD interrogator 120 can operate on the received data and communicate the network status and/or component status to CRMM 124. Thus, when CRMM 124 requests information specific to a customer/subscriber, activity database 126 may provide historical customer-specific performance data to CRMM 124. In addition, CRMM 124 may also gather additional real-time data. This may not be the only way information is input into activity database 126. For example, outside plant personnel, network status organizations, and/or others may also provide or key-in information to activity database 126.

If CRMM 124 can identify a component in WAN 110 that is under-performing and/or has a significant degradation, the news of this network problem may be sent to the subscriber making the inquiry utilizing an auto-response system. System or component degradation may be hierarchically ordered by CRMM 124 in order of occurrence (date and time), probability of causing a problem, and/or severity. Subject matter in a subscriber query may be linked to an occurrence utilizing a failure analysis, and CRMM 124 may automatically reply to the subscriber request via a communication interface linked to or with WAN 110.

In some cases, the reply to a subscriber may be customer-specific system performance status even when the system is operating within its specified limits. An auto response that provides system performance may be provided to the subscriber based on real-time actual performance, a derived performance characteristic, or a high probability that a component within a communication system has caused unacceptable performance, and/or some other metric or data. In the event that a subscriber inquiry is relatively complicated, the inquiry may be sent from CRMM 124 to agent 130. As such, agent 130 may have access to activity database 126 via LAN 128, and CRMM 124 may automatically provide agent 130 with a list of system performance characteristics that come from distributed PLDs and are subscriber-specific. Although only one agent is illustrated, CRMM 124 may be configured to supply hundreds of agents.

In practice, CRMM 124 may store historic communication responses to subscriber inquiries. As such, in some cases CRMM 124 may determine with a high probability what the problem is for a given subscriber circumstance and provide an inquiring subscriber with a "canned" response. In practice, responses may be assigned confidence levels based on how likely the response is to cover the subscriber inquiry. When the confidence level is low, the inquiry can be routed to agent 130 for manual processing; when the confidence level is high the auto response system can automatically respond.

The system disclosed may utilize many different methods to monitor the communication network 110. A stand-alone PLD 150 or any PLD may use monitoring technologies based on, for example, anomaly detection, heuristics, traffic pattern analysis, application analysis, payload analysis, code violations, as well as passive listening and/or active listening. In some embodiments, an appliance or stand-alone PLD 150 may provide for near-real-time analysis of usage, availability, and performance for applications and services running across public and private networks. For example, stand-alone PLD 150 may measure response times for Internet Protocol applications, network applications, and/or other Web applications. Depending upon implementation detail, stand-alone PLD 150 may be coupled to a port on a data center switch. In some applications, stand-alone PLD 150 may be located behind a corporate firewall, it may track and analyze network activity and usage, and generated information may be stored in a repository or database.

Utilizing stand-alone PLD 150 in combination with activity database 126 may allow agents 130 and technicians to more quickly identify and resolve network problems. In operation, localizing a problem may be accomplished by considering, for example, the interdependencies of a larger network. In effect, such a solution may narrow down the search for customer-specific performance data to a particular component or platform. When a subscriber calls for service, they may be asked questions about their problem. Utilizing an interactive-voice-response system (IVR) the system may be able to learn more about the subscriber's problem and pinpoint a malfunctioning device. Moreover, call-center support personnel may be informed of the problem and made aware of customers who could be impacted by the problem—allowing call center personnel to proactively notify potentially affected customers.

Figure 2:
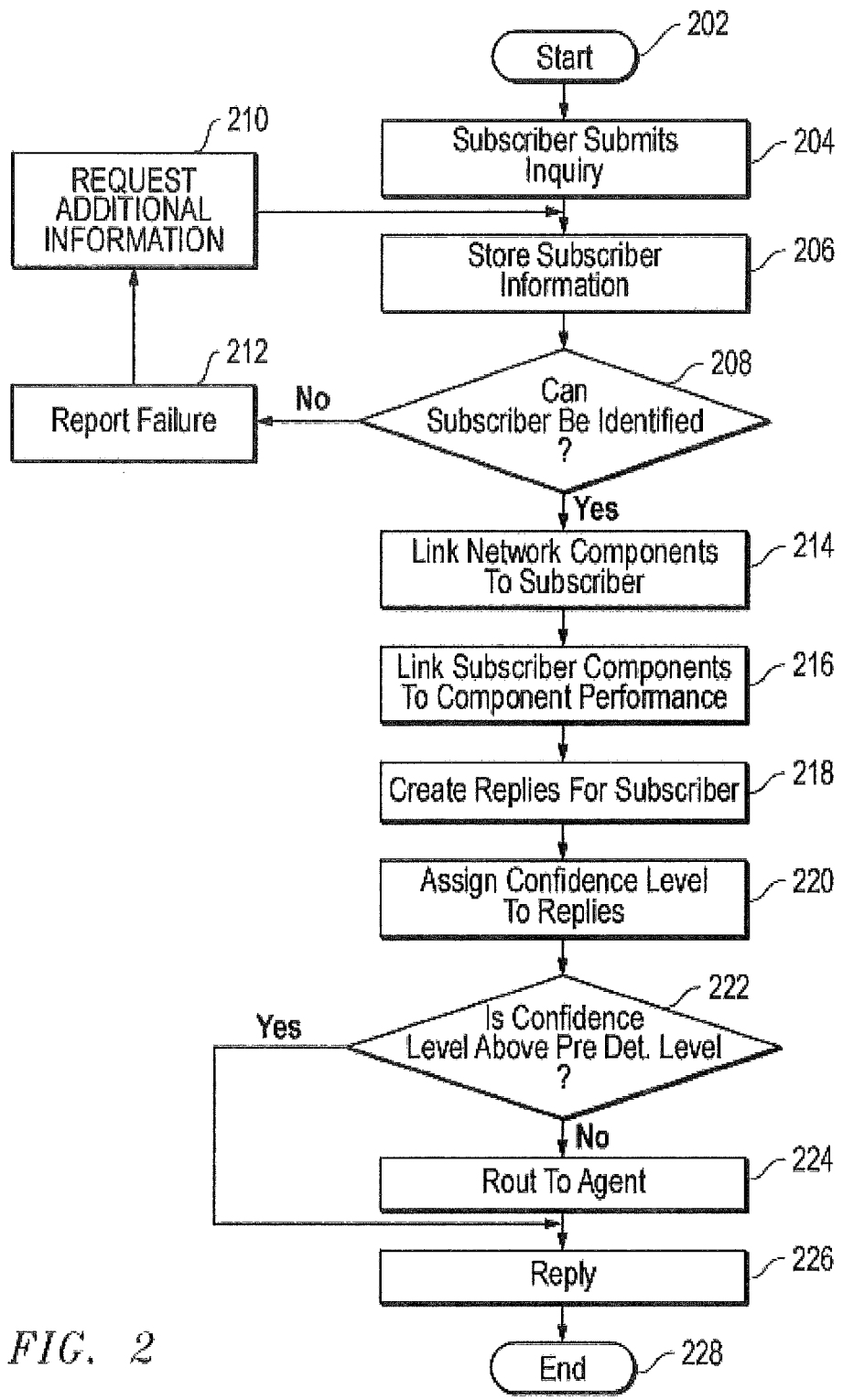
FIG. 2 shows a flow diagram of a method for providing customer service for a communication service provider in accordance with the teachings disclosed herein.

Referring now to FIG. 2 a method of operation that may be used in connection with system 100 of FIG. 1 is illustrated. The method starts at 202 and proceeds to 204 where a subscriber submits an inquiry to a service provider. Data can be gathered regarding the inquiry such as a CallerID telephone number, an e-mail address, and account number, or a MAC address of the subscriber. Additional data may be gathered from prompting the caller and storing caller responses. Additional data can include details about the phenomena surrounding the caller's problem such as slow speed, inoperability, intermittency or whether the problem is reoccurring. This information can be utilized to help diagnose and isolate the cause of the problem.

The subscriber information may be stored at step 206; at decision step 208 it may be determined whether the subscriber can be accurately identified. If the subscriber cannot be accurately identified, then a failure may be recorded at step 212 and additional information may be requested at 210. The method may then proceed back to step 206. If the subscriber can be identified, the monitored components that supply the subscriber with communication services may be identified at step 214. At step 216, the monitored network components that are linked to the subscriber may be queried for past performance and possibly current performance problems. A reply to the subscriber may be created from a library of replies based on component performance at step 218. A confidence level may be assigned to each reply at step 220 based on the likelihood that a reply provides useful information. If the confidence level for a given reply is above a predetermined value, the method may proceed to reply at step 226 where the reply is sent. If the confidence level of the reply is less than a predetermined level, the inquiry may be routed to an agent at step 224 and the process ends at step 228.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving performance data associated with a service provided by at least one component of a communication network to one or more subscribers, wherein the performance data is gathered by one or more passive listening devices that monitor a performance characteristic of the at least one component of the communication network;
identifying a particular component that provides a particular service to a particular subscriber based on a subscriber inquiry received from the particular subscriber;
identifying particular performance data within the received performance data, the particular performance data associated with the particular service provided by the particular component; and
based on the particular performance data, determining a performance status of the particular component.

2. The method of claim 1, further comprising:
generating one or more responses to the subscriber inquiry based on the performance status;
assigning a confidence level to each of the one or more responses based on relevance to the subscriber inquiry; and
automatically sending the one or more responses to the particular subscriber, the one or more responses having a corresponding assigned confidence level that satisfies a threshold level.

3. The method of claim 2, further comprising automatically sending the subscriber inquiry to an agent station in response to determining that the assigned confidence level corresponding to each of the one or more responses does not satisfy the threshold level.

4. The method of claim 3, further comprising sending information identifying the particular component to the agent station.

5. The method of claim 2, wherein the one or more responses are generated based on information obtained from a database.

6. The method of claim 1, further comprising:
receiving network status data associated with the particular component of the communication network, wherein the network status data is generated by the one or more passive listening devices that monitor a network status of the particular component;
determining a particular network status of the particular component that provides the particular service to the particular subscriber, wherein the particular network status is determined based on the received network status data; and
in response to determining that the particular network status indicates a network problem, generating one or more status-specific responses to the subscriber inquiry, the one or more status-specific responses indicating the network problem.

7. The method of claim 6, wherein the network status data includes network status information, component network status information, or a combination thereof.

8. The method of claim 6, wherein the one or more status-specific responses indicate a severity of the network problem and include occurrence information associated with one or more occurrences of the network problem.

9. The method of claim 1, wherein the performance data is received from a performance database.

10. An apparatus comprising:
a database interface to request performance data from a performance database, wherein the performance data is associated with a service provided by at least one component of a communication network to one or more subscribers, and wherein the performance data is gathered by a plurality of passive listening devices that monitor a performance characteristic of the at least one component;
a customer relationship management component configured to:
identify a particular component based on a subscriber inquiry received from a particular subscriber;
identify particular performance data within the performance data obtained from the performance database; and
determine a performance status of the particular component based on the particular performance data; and
a communication component to send one or more responses to the particular subscriber, the one or more responses based on the performance status.

11. The apparatus of claim 10, wherein the customer relations management component is further configured to classify the subscriber inquiry as a network performance issue, and wherein the particular component is identified based of whether the particular performance data indicates network degradation.

12. The apparatus of claim 10, wherein the customer relations management component is further configured to:
determine, based on the particular performance data, whether the particular component has unacceptable performance; and
determine a ranking for the at least one component based on a level associated with the unacceptable performance.

13. The apparatus of claim 10, wherein at least one of the plurality of passive listening devices is located behind a firewall of the communication network.

14. The apparatus of claim 10, wherein at least one of the plurality of passive listening devices is located within a network appliance of the communication network.

15. The apparatus of claim 10, wherein each of the plurality of passive listening devices is coupled to a data center switch.

16. The apparatus of claim 10, wherein the performance data in the performance database is associated with the particular subscriber based on a geographic location associated with the particular subscriber, subscriber connection data, one or more services provided to the particular subscriber, or a combination thereof.

17. The apparatus of claim 10, wherein each of the plurality of passive listening devices is configured to monitor the performance characteristic based on anomaly detection, heuristics, traffic pattern analysis, application analysis, payload analysis, code violations, or a combination thereof.

18. The apparatus of claim 10, wherein at least one of the plurality of passive listening devices is a stand alone device that is not disposed within another network component.

19. The apparatus of claim 10, wherein the performance data is stored in the performance database by a server that periodically queries the plurality of passive listening devices to obtain the performance data.

20. An apparatus comprising:
means for requesting performance data from a performance database, wherein the performance data is associated with a service provided by at least one component of a communication network to one or more subscribers, and wherein the performance data is gathered by one or more passive listening devices that monitor a performance characteristic of the at least one component;
means for identifying a particular component that provides a particular service to a particular subscriber based on a subscriber inquiry received from the particular subscriber;
means for identifying particular performance data within the performance data obtained from the performance database, the particular performance data associated with the particular service provided by the particular component;
means for determining a performance status of the particular component based on the particular performance data; and
means for sending one or more responses to the particular subscriber, the one or more responses based on the performance status.

\* \* \* \* \*